Dec. 27, 1949  W. A. GARRATT  2,492,740
SOUND CREATING DEVICE
Filed Dec. 26, 1946

INVENTOR.
Walter A. Garratt
BY
Wood, Arey, Herron & Evans
ATTORNEYS

Patented Dec. 27, 1949

2,492,740

UNITED STATES PATENT OFFICE 2,492,740

SOUND CREATING DEVICE

Walter A. Garratt, Covington, Ky., assignor to Philip G. Vondersmith

Application December 26, 1946, Serial No. 718,402

9 Claims. (Cl. 116—142)

This invention relates to air operated warning devices or horns and is particularly directed to a horn of the type adapted for use on automobiles, bicycles, boats or vehicles of any sort for warning of the approach of the vehicle. The horn of this invention is inclusive of a valve and is of that type in which the sound is created by the rapid opening and closing of a valve, the vibratory motion of the valve being caused by means of air delivered under pressure.

It has been the principal objective of the present inventor to produce a simple, inexpensive, and improved air operated warning device of the above character which has no maintenance cost and is durable enough to last a long time.

It has been a further object to provide a horn of this type which will emit a melodious sound of sufficient volume to act as a warning of the approach of the vehicle.

More specifically it has been an object of the present inventor to provide a resilient valve seat which tends to actuate the valve under the influence of air pressure, thus allowing both the valve and valve seat to act on the air column to increase turbulence.

In accordance with these objects the preferred embodiment of the invention incorporates a pliable and extremely elastic valve seat. The passage of air through the orifice of the seat and against the valve produces an entirely new result, primarily due to the fact that the seat in each cycle of movement will stay in contact with the valve until tension is reached sufficient to move the valve away from the seat. Accordingly, when the valve leaves the seat, it leaves it very suddenly and the action is much more explosive, that is to say, each vibration is sharper and with more snap. As a result, a great deal of volume can be procured with a very small device, more vibratory action being procured as a result of the flexing of the seat and the more sudden movement of the valve as heretofore stated.

Other objects and advantages of the invention will be more fully apparent from a description of the accompanying drawings in which.

Figure 1:
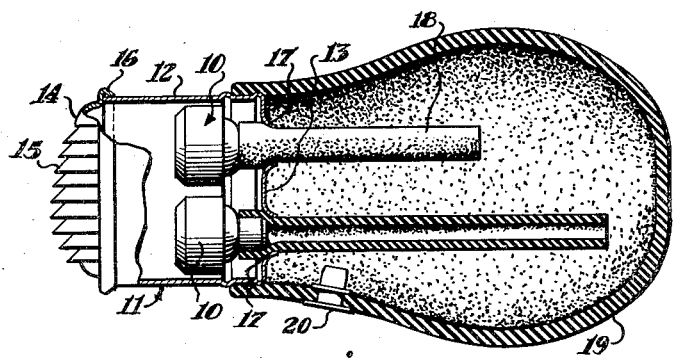
Figure 1 is a sectional view taken longitudinally of a horn incorporating the present improvements and disclosing the use of two sound-producing devices, each producing a different but harmonizing note.

Referring to Figure 1 of the drawings, the sound creating units are indicated at 10. In the present instance two are employed. It will be obvious that the number utilized may be varied as desired. By using two or more the manufacturer can supply a horn having a more harmonious tone.

These sound units 10 are supported within a casing structure, generally indicated at 11. The casing structure is generally cylindrical, the side wall being indicated at 12. It includes an inner end wall 13 and an outer or forward wall 14 providing a grill structure 15. This forward wall is removably secured over the front end of the casing by means of an annular flange 16 crimped over the forward edge of the casing wall.

The units 10 are supported in the back wall specifically within apertures 17 therein. The rubber tubes 18, which provide the air input members for the units, pass through these openings and are disposed within the bulb 19 through which air pressure is provided. This bulb is adapted to be squeezed in the conventional manner, including for this purpose an air intake valve 20 in its side wall. When the bulb is squeezed, the valve 20 closes and the air is then delivered through the tubes to the sound units. The metal around the openings 17 is flared and the units are secured by wedging the rubber tube lengths into these tapered openings. The tubes are of different length, the length being calculated so as to produce different notes. In other words by varying the length of these intake tubes the units produce notes which are in harmony.

Figure 2:
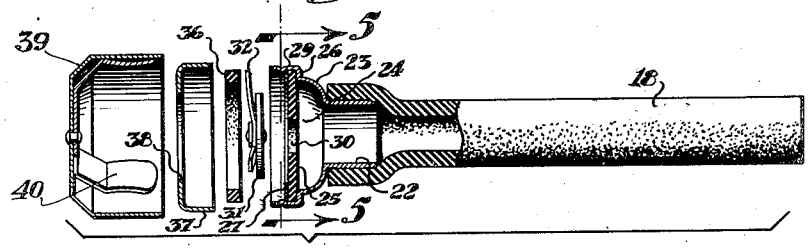
Figure 2 is an exploded view, showing in section, the various parts of one of the sound producing units.

Each of the units consists of the structure disclosed in Figure 2. Specifically, the body 21 consists of a thin, sheet metal, thimblelike casing which has a short tubular extension 22 at one end. The length of tubing 18 is fitted over this tubular extension and thus provides for the input of air. The thimblelike casing includes a spherical portion 23, providing a chamber 24 through which the air passes through the valve seat 25. A circular ledge 26 is provided, this ledge being disposed at a right angle to the thimblelike casing. The circular ledge, as stated, provides the surface upon which the valve seat is mounted, the margin of the valve seat resting upon the ledge. The seat is held in this position by means of a washer element 27 lying against the margin of the valve seat and held in this position by an annular crimp 28 in the cylindrical side wall 29 of the casing.

The valve seat is formed of rubber, preferably, providing a thin, extremely resilient and pliable seat member in the nature of a disc having an aperture 30 disposed axially, centrally thereof. The valve element 31 is held against the forward face of the seat over the opening and may be formed of a disc of some hard material such as metal, plastic, or any other suitable material. The valve is held in this relationship to the seat by means of a spring spider 32 having three arms 33. The central part of the spider is attached centrally of the valve by means of a rivet 34 disposed axially of the valve disc, there being a washer 35 held against the front face of the spider. The outer ends of the arms of the spider are held against the crimp 28 by means of a rubber ring 36 and the ring in turn is held in position by means of a cap 37. The cap 37 includes a cylindrical wall and has an opening 38 in its front wall, the material around the opening holding the rubber ring 36 against the spider.

An amplifier element 39 may be secured over the entire assembly as shown in Figures 1 and 2. This element is of thimblelike form considerably larger than the assembly of the horn unit. It incorporates spring arms 40 therein frictionally engaging the assembled unit. Adequate clearance is provided around the cap element where it engages over the unit so as to permit emission of sound between the amplifier element and the main sound unit and through the grill at the front of the casing which encloses these units as shown in Figure 1.

Figures 3, 4, 5, 7:
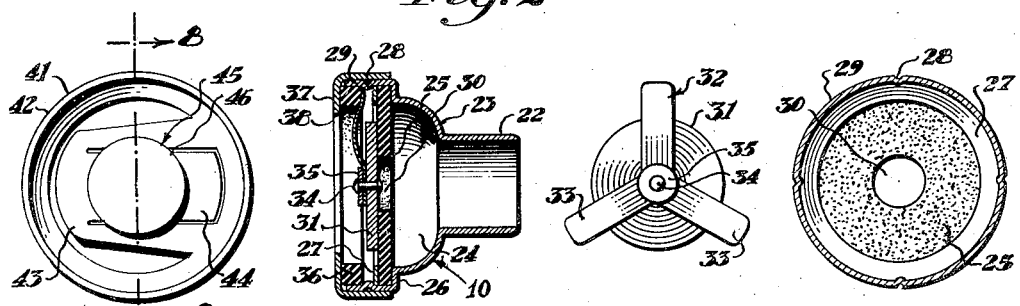
Figure 3 is a sectional view taken diametrically of the assembled unit and showing the same in position with the parts at rest.
Figure 4 is a front view of the valve and its supporting means.
Figure 5 is a sectional view taken on line 5—5, Figure 2, detailing the valve seat.
Figure 7 is a front view taken similar to Figure 4 but showing another type of valve support means.
Figure 8:
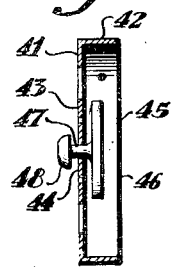
Figure 8 is a sectional view taken on line 8—8, Figure 7.

A modified form of valve support means may be provided as shown in Figures 7 and 8. In this form a disc 41 of thin, flexible metal is formed to provide an annular flange 42. The face of the disc is cut away to provide a support flange 43 lying at a right angle to and across the axis of the disc. This flange is slit to provide a flexible extension 44 within the flange.

A valve 45 is mounted in this flexible extension directly axially of the disc. It consists of a member having a flat valve portion 46 and a stud 47 traversing the flange. The end of the stud may be upset to form a head 48 adapted to hold the valve loosely in position. The head of the stud is disposed relative to the valve portion so that the valve is free to float or rock in the opening in which it is mounted. It will be seen that the extension 44 which supports the valve is flexible and the flange 43 from which it is formed is also flexible. Thus, the valve has an extremely flexible mounting and is free to adjust in all directions within proper limits for efficient contact with the seat. It will be understood that the disc and its supported valve may replace the valve and spider of the previous views when the modified form is utilized.

It will be noted that the valve of the modified form includes a rounded portion where the stem joins the valve. Accordingly, as indicated in the drawing, the engagement of this portion with the bore of the extension 44 will cause a slight spacing of the valve head from the extension. Thus, the extension 44 will flex under the action of the valve as the valve is unseated.

Figure 6:
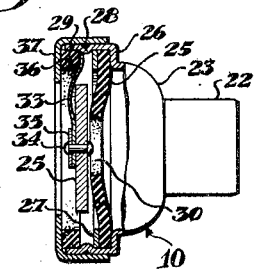
Figure 6 is a sectional view taken similar to Figure 3 but showing the valve in operation, with the seat flexed and the valve just off the seat.

Referring again to the main views, it will be noted that when air is applied under pressure by squeezing the bulb, the rubber valve seat disc 25 bulges outwardly as shown in Figure 6. This action of the seat carries the valve outwardly with it since the valve is suspended under spring tension. However, the valve will not be unseated until the elastic properties of the disc reach a tension requiring greater pressure to continue than that necessary to unseat the valve. When this tension is reached, the valve breaks contact with the disc suddenly so that the escape of air is substantially explosive. These movements of the valve, of course, take place at an extremely high rate.

The vibration of the valve and the movements of the seat are produced with but very little pressure. The orifice, having tended to enlarge since the disc has become convex but having been restrained from doing so while engaged with the valve because of friction now expands; or to be more exact, snaps to a larger diameter. Because of its lighter weight and less inertia, the seat disc returns to normal more rapidly than the valve. The projected energy is absorbed by the spring and returns the valve. However, since the return of the valve is later in the cycle than the return of the seat to its normal position, there is more clearance and, therefore, when the valve seats it does so squarely and with considerable impact. This impact energy being transferred to the rubber disc is converted by rebound to the reversal of the valve for the next cycle.

It is obvious, of course, that the valve assembly represents a definite weight and thus must be included in all calculations. There are a number of factors which contribute or coordinate rhythmically for the creation of tone such as sonic pulsations set up in the casing by the pumping or vibrations under the disc, also the sound loading which imparts an intermittent thrust on the outside of the disc, the two actions being one-half a cycle apart.

The whole purpose is to produce a series of minor explosions setting up a carrier wave of semi-musical quality upon which may be impressed resonance, harmonics and overtones. The result is an efficiently articulated musical note capable of wide variation in the manufacture. These variations are a result of alterations such as allowing the spring freedom to clatter, thus emitting the sound characteristics inherent in a tempered spring or mounting on the vibration valve a section of tuned wire.

It is well known that a column of air under some compression is a vigorous conductor of sound, and by its very nature is extremely sensitive and will amplify a faint sound many times. To adjust the pitch of the horn the lengths of tubing 18 may be lengthened or shortened. By lengthening, the pitch is lower; by shortening, it is raised. The sections of tubing 18 form resonators with definite pitches. For example, the adjustment of pitch may vary from using no tubing at all up to a tube four inches long through which variation, a range of over an octave may be obtained. If a still lower tone is desired, the valve assembly may be made heavier and the same variations in tubing used.

When applying air to operate the sounder, a coupling of much greater area must be used—such as that of the bulb 19. The reason for this is that the sounder casing, including the tubing, is sympathetic to the vibration period represented by its own resonance. Therefore if the tubing terminates in a receptacle of greater dimensions and consequently different pitch, the sounder will isolate itself and harmony will reign. If it is desired to use a source of air from a long hose, it will still be necessary to interpose a container of at least one cubic inch between the air supply and the sounder. If this were not done, the air vibration set up in the sounder and tubing would tend to continue on down the supply hose and the formula would cease to exist. There may be sounds but so many variables would make it pure chance—therefore some such sonic filter should be specified.

A good method to employ in evaluating this is to consider that a jet of air is released during the period of one degree on the top peak of the sine curve, hence the phrase minute explosion. A sound amplifier or horn may be attached to the sounder if a very loud tone is required.

Having described my invention, I claim:

1. A sound creating device comprising; a casing, an inlet tube leading to said casing, a valve seat mounted in the casing and having an aperture centrally thereof for the passage of air under pressure through the casing, a valve supported against the valve seat about the margin of the aperture in the valve seat and on the side of the valve seat opposite to the inlet tube said valve completely covering said valve seat aperture and overlapping said valve seat at the valve seat areas adjacent said valve seat aperture, and support means for the valve consisting of a member having spring tension and supporting the valve normally against the seat but permitting unseating under predetermined pressure, said valve seat being of rubber and extremely pliable so as to stretch and deflect as the air is forced through its opening against the valve, the seat tending to cling to the valve until a pressure sufficient to unseat the valve is reached at which time the valve leaves the seat suddenly, seating and unseating of the valve therefore being more violent and the reaction against the seat as the valve returns to seated position being effective for setting up additional vibration.

2. In a horn construction; a sound projecting chamber, a rubber bulb secured at the rear thereof, a plurality of sound creating units mounted within the sound projecting chamber, the sound projecting chamber including a rear wall having openings therein within and through which the sound creating devices are disposed, said sound creating units including inlet tubes extending into the interior of the bulb, said tubes being of different lengths for producing different notes so that when the bulb is pressed the air passes through the tubes into the sound creating units and a melodious tone is produced, each of said sound creating units including a valve seat having an aperture through which the air under pressure must pass and a valve seated on the valve seat at the discharge side thereof, and means for yieldably mounting the valves, said valve seats being pliable to permit flexing laterally as the air is forced through the openings to the valves.

3. A sound creating device comprising; a casing, an inlet tube leading to said casing, a valve seat mounted in the casing and having an aperture centrally thereof for the passage of air under pressure through the casing, and a valve yieldably supported against the valve seat, said valve engaging the radial face of the valve seat immediately adjacent the aperture thereof on the side opposite to the inlet tube, said valve seat being extremely pliable so as to stretch and deflect as the air is forced through its opening against the valve, the seat tending to cling to the valve until a pressure sufficient to unseat the valve is reached at which time the valve leaves the seat suddenly, seating and unseating of the valve therefore being more violent, and the reaction against the seat as the valve returns to seated position being effective for setting up additional vibration.

4. In a horn construction; a sound projecting chamber, a compressible bulb secured at the rear thereof, and including an air inlet control valve to permit air to be introduced into said compressible bulb, and a plurality of sound creating units mounted within the sound projecting chamber, said sound creating units including inlet tubes extending into the interior of the bulb, said tubes being of different lengths for producing different notes so that when the bulb is pressed the air passes through the tubes into the sound creating units and a melodious tone is produced.

5. A sound creating device comprising; a casing, a valve seat having an aperture in the center thereof, said valve seat being mounted in the casing and a valve yieldably supported against the side of said seat opposite to said inlet tube and over the aperture of said valve seat so as to permit unseating of the valve when air is delivered through the valve seat, said valve seat consisting of a flexible disc, said disc being securely attached to the casing around its margin, said valve seat adapted to flex when air under pressure is delivered through the aperture thereof against the valve.

6. In a horn construction; a sound projecting chamber, a rubber bulb secured at the rear thereof and including an air inlet control valve therein and a sound creating unit mounted within the sound projecting chamber, said sound creating unit including an inlet tube extending into the interior of the bulb, said sound creating unit including a valve seat having an aperture through which the air under pressure must pass and a valve seated on the valve seat at the front thereof, means for yieldably mounting the valve, and said valve seat being pliable to permit flexing laterally as the air is forced through its opening to the valve.

7. A sound creating device comprising; a casing, a valve seat mounted in the casing, and a valve yieldably supported relative to said seat so as to permit unseating of the valve when air is delivered through the valve seat, said valve seat consisting of a flexible disc having an aperture therein and being securely attached to the casing, said valve seat adapted to flex when air under pressure is delivered through the aperture thereof against the valve.

8. A sound creating device comprising; a casing, a valve seat mounted in the casing, a valve yieldably supported relative to said valve seat, and a disc secured in said casing for supporting said valve, said disc including a flexible arm disposed at right angles to the axis of the valve and the valve seat, said valve being supported on said flexible arm and adapted to bear against the arm whereby the arm is flexed when the valve is unseated as air is delivered through the valve seat, said valve seat consisting of a flexible disc having an aperture therein and being securely attached to the casing, said valve seat adapted to flex when air under pressure is delivered through the aperture thereof against the valve.

9. A sound creating device comprising; a casing, a valve seat marginally secured in said casing, said valve seat consisting of a soft rubber disc having a small aperture in the center thereof, a valve disc disposed against the outlet side of said valve seat, covering said valve seat aperture and engaging said valve seat marginally of the aperture therein, an air delivery tube entering said casing on the side of said soft rubber disc opposite to said disc and, means for yieldably supporting said valve disc.

WALTER A. GARRATT.

REFERENCES CITED

The following references are of record in the file of this patent:

UNITED STATES PATENTS

| Number | Name | Date |
|---|---|---|
| 1,627,467 | Sparlin | May 3, 1927 |
| 1,815,552 | Eckhardt | July 21, 1931 |
| 1,862,086 | Hueber | June 7, 1932 |

FOREIGN PATENTS

| Number | Country | Date |
|---|---|---|
| 148,926 | Switzerland | Oct. 16, 1931 |
| 641,352 | France | Apr. 16, 1928 |